United States Patent
Shkolnikov et al.

(10) Patent No.: US 11,229,912 B2
(45) Date of Patent: *Jan. 25, 2022

(54) PARTICLE SEPARATION

(71) Applicant: HEWLETT-PACKARD DEVELOPMENT COMPANY, L.P., Spring, TX (US)

(72) Inventors: Viktor Shkolnikov, Palo Alto, CA (US); Alexander Govyadinov, Corvallis, OR (US); Pavel Kornilovich, Corvallis, OR (US); Erik D. Torniainen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/605,706

(22) PCT Filed: Mar. 27, 2018

(86) PCT No.: PCT/US2018/024665
§ 371 (c)(1),
(2) Date: Oct. 16, 2019

(87) PCT Pub. No.: WO2019/190488
PCT Pub. Date: Oct. 3, 2019

(65) Prior Publication Data
US 2021/0001337 A1    Jan. 7, 2021

(51) Int. Cl.
*B01L 3/00* (2006.01)
*G01N 1/40* (2006.01)

(52) U.S. Cl.
CPC ... *B01L 3/502761* (2013.01); *B01L 3/502715* (2013.01); *B01L 2300/0816* (2013.01);
(Continued)

(58) Field of Classification Search
CPC ..... B01L 2200/0652; B01L 2300/0816; B01L 2300/0864; B01L 2400/0439;
(Continued)

(56) References Cited

U.S. PATENT DOCUMENTS

| 8,021,614 B2 | 9/2011 | Huang et al. |
| 8,807,879 B2 | 8/2014 | Toner et al. |

(Continued)

FOREIGN PATENT DOCUMENTS

| JP | 2018030057 A | 3/2018 |
| WO | WO2001035071 A2 | 5/2001 |

(Continued)

OTHER PUBLICATIONS

Torniainen, Erik, et al., Bubble-driven Inertial Micropump, Dec. 2012, Physics of Fluids.

*Primary Examiner* — Jennifer Wecker
(74) *Attorney, Agent, or Firm* — HP Inc. Patent Department

(57) ABSTRACT

An example system includes an input channel having a first end and a second end to receive particles through the first end, a separation chamber, at least two output channels, and an integrated pump to facilitate flow through the separation chamber. The separation chamber is in fluid communication with the second end of the input channel. The separation chamber has a passive separation structure, the passive separation structure including an array of columns spaced apart to facilitate separation of particles in a flow based on a size of the particles. Each output channel is in fluid communication with the separation chamber to receive separated particles. The integrated pump is positioned within at least one of the input channel or one of the at least two output channels.

15 Claims, 6 Drawing Sheets

(52) U.S. Cl.
CPC .......... *B01L 2300/0864* (2013.01); *B01L 2400/0442* (2013.01); *B01L 2400/0487* (2013.01); *G01N 1/4077* (2013.01)

(58) Field of Classification Search
CPC ..... B01L 2400/0442; B01L 2400/0487; B01L 2400/086; B01L 3/502715; B01L 3/502761; G01N 1/4077; G01N 15/02; G01N 15/1056; G01N 15/1484; G01N 2015/0288; G01N 2015/1006; G01N 2015/1081; G01N 2015/1087; G01N 2015/149; G01N 2015/1493
See application file for complete search history.

(56) References Cited

U.S. PATENT DOCUMENTS

| | | |
|---|---|---|
| 9,333,510 B2 | 5/2016 | Di Carlo et al. |
| 2004/0086427 A1 | 5/2004 | Childers et al. |
| 2006/0051218 A1 | 3/2006 | Harttig |
| 2018/0080060 A1* | 3/2018 | Gifford .............. G01N 15/1056 |

FOREIGN PATENT DOCUMENTS

| | | |
|---|---|---|
| WO | WO2006108101 A2 | 10/2006 |
| WO | WO2014116183 A1 | 7/2014 |
| WO | WO2016136273 A1 | 9/2016 |

\* cited by examiner

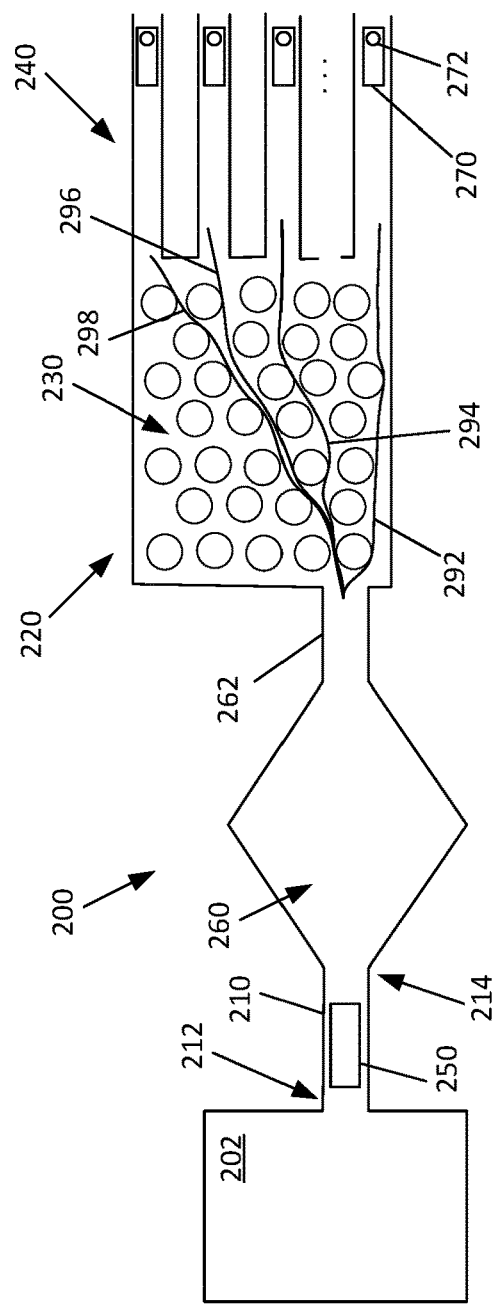
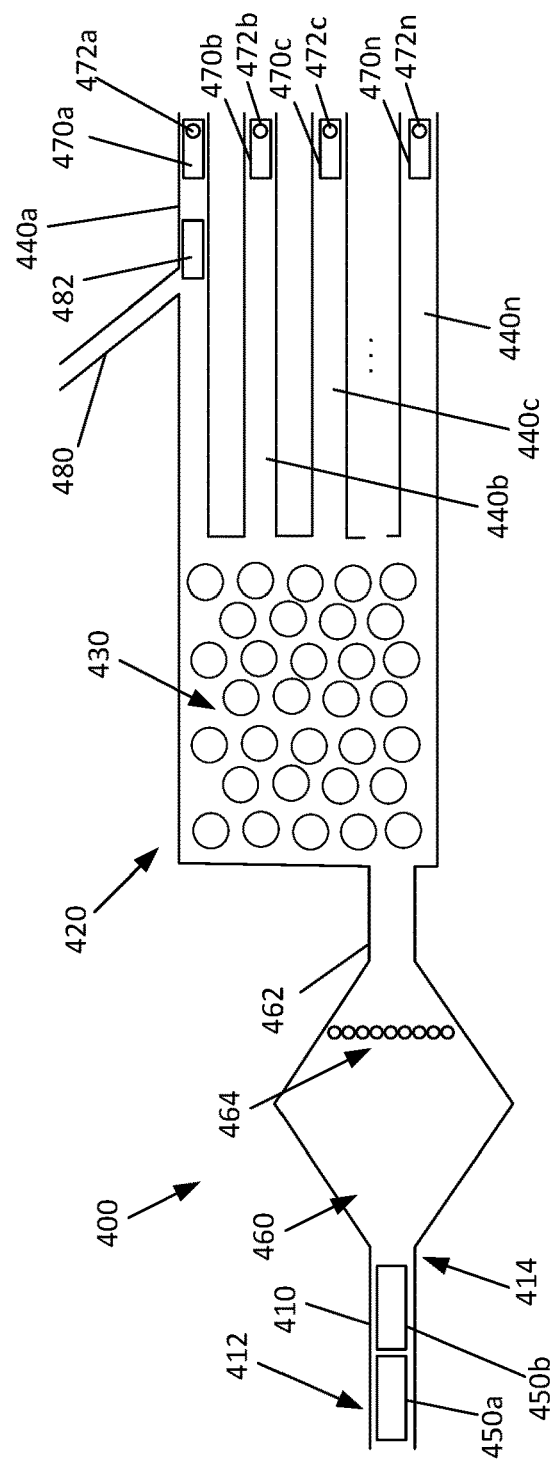
Figure 3
Figure 4

PARTICLE SEPARATION

BACKGROUND

Microfluidic devices are increasingly commonplace in a variety of environments. For example, microfluidic devices have applicability in biology, medicine, genetics and numerous other fields. Microfluidic devices may include such devices as lab-on-a-chip micro-total analytical systems and can carry, analyze, or process various particles, bacteria, biological cells and other solid and soft objects of microscale. Various microfluidic devices may include fluids flowing through narrow channels. In a lab-on-a-chip, for example, blood cells may be moved from one chamber to another, such as from an input port to a reaction chamber. In other examples, the microfluidic device may be provided for the flow of other fluids or materials, such as blood or other biological fluids.

BRIEF DESCRIPTION OF THE DRAWINGS

For a more complete understanding of various examples, reference is now made to the following description taken in connection with the accompanying drawings in which:

FIG. 3 illustrates separation of particles in the example system of FIG. 2;

FIG. 4 illustrates another example system for separation of particles;

DETAILED DESCRIPTION

As noted above, microfluidic devices may be provided to flow fluids through narrow channels to, for example, reaction chambers. In various examples, the fluids may include any number of particles within a flow. A reaction chamber or another output of the channels may use the particles in a separated or concentrated condition. Accordingly, the various particles in a flow are separated (e.g., sorted or categorized) for use within the microfluidic device or for output from the microfluidic device. In other examples, the various particles may be purified, or concentrated.

In order to separate the particles, some devices use a system of sensors and valves to open a corresponding channel to direct a particle into an appropriate channel. Such sensors and valves typically result in slowing of the flow upstream of the valve. Further, such sensors and valves have the potential to fail, resulting in failure of sorting in all output channels.

Further, categorizing or flow of particles may be facilitated with the use of external pumps. External pumps (e.g., syringe pumps or capillary pumps) may increase complexity and expense by requiring a pump to be outside the lab-on-a-chip, for example.

Various examples described herein relate to separation or concentration of particles in, for example, a microfluidic device. A flow of particles containing at least two categories of particles is sorted by directing each particle from an input channel through a chamber of passive separation structures. The passive separation structure may include columns, or posts, that are spaced apart in a manner which directs particles in the flow along different paths based on the size of the particles. The device includes at least one integrated pump, such as an inertial pump, in the input channel or an output channel to facilitate flow of the particles. In various examples, the integrated pumps are thermal inkjet resistors. In other examples, inertial pumps may be actuated by a piezo-drive membrane or by any other displacement device driven force such as, for example, electrostatic, pneumatic, magneto-strictive, magnetic or similar forces. In some examples, the integrated pump in at least one output channel is operable to direct the separated particles to a drop-on-demand outlet. In various examples, at least one output channel includes a reservoir for accumulation of the separated particles. The use of integrated pumps provides significant advantages for separation of particles using passive structures. For example, the integrated pumps provide an integrated system with a smaller footprint.

Figure 1:
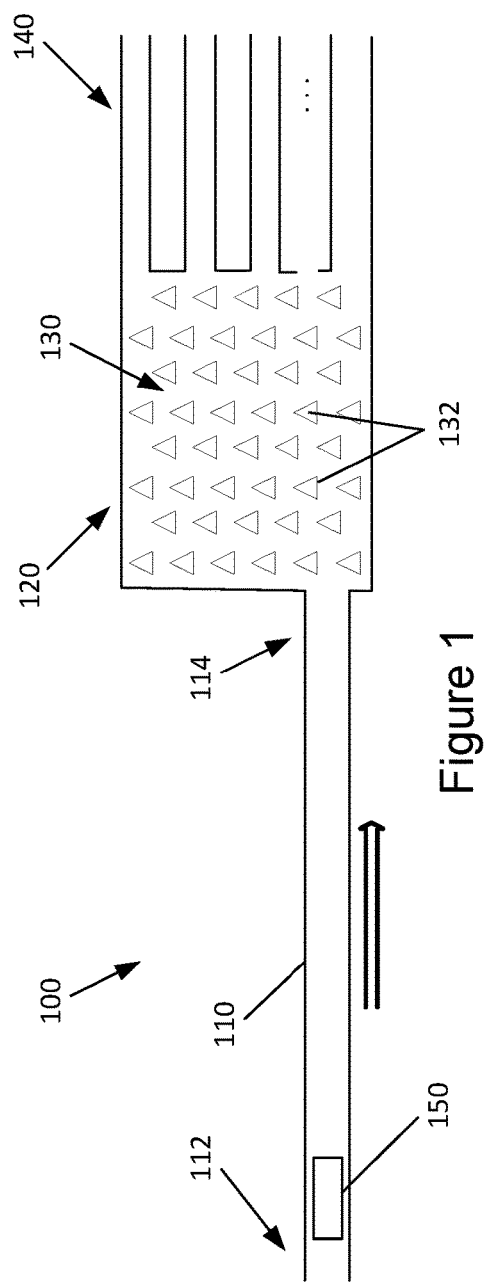
FIG. 1 illustrates an example system for separation of particles.

Referring now to the Figures, FIG. 1 illustrates an example system for separation of particles. The example system may be any of a variety of devices, such as microfluidic devices, lab-on-a-chip, or micro total analytical systems, for example. Accordingly, while the example system 100 may be described in the microfluidic context, in other examples, the example system 100 may include a system for categorizing larger particles than those found in the microfluidic environment. In the example of FIG. 1, the example system 100 includes an input channel 110 with a first end 112 and a second end 114. The input channel 110 may receive particles therein through the first end 112. An arrow in the input channel 110 illustrated in FIG. 1 indicates the direction of flow of the particles. As noted above, the particles may include any of a variety of particles such as, but not limited to, blood cells or other cells, beads, solids, etc. In various examples, the input channel 110 may be a long and/or narrow channel.

In various examples, the example system 100 is a microfluidic device, and the input channel 110 is a microfluidic channel. In one example, the input channel 110 has a cross-sectional width of between about 10 μm and about 500 μm. Various examples of the system 100 may be formed by performing various microfabrication and/or micromachining processes on a substrate to form and/or connect structures and/or components. The substrate may comprise a silicon based wafer or other such similar materials used for microfabricated devices (e.g., glass, gallium arsenide, plastics, etc.). Examples may comprise microfluidic channels, fluid actuators, and/or volumetric chambers. Microfluidic channels and/or chambers may be formed by performing etching, microfabrication processes (e.g., photolithography), or micromachining processes in a substrate. Accordingly, microfluidic channels and/or chambers may be defined by surfaces fabricated in the substrate of a microfluidic device. In some implementations, microfluidic channels and/or chambers may be formed by an overall package, wherein multiple connected package components that combine to form or define the microfluidic channel and/or chamber.

In various examples, a stream of particles flowing through the input channel 110 may include two, three, or more different categories of particles. In various examples, the categories of particles may include, but not limited to, solid particles, soft particles, gas bubbles, biological cells, bacteria, droplets of fluid (e.g., immiscible fluid, also referred to as colloidal particles), and clusters thereof. A category may include a particular type of particle or a group of types of particles. For example, in one example, a category may include all blood cells, and in another example, a category may include a particular type of blood cell. In one example, the sensor is positioned to allow detection of a particle and identification of at least one parameter associated with the particle which allows categorization of the particle.

In the example of FIG. 1, the example system 100 includes a separation chamber 120. The separation chamber 120 is in fluid communication with the second end 114 of the input channel 110. Thus, the separation chamber 120 may receive a flow of particles flowing through the input channel 110. In various examples, the separation chamber 120 includes a passive separation structure 130 to separate particles in a flow based on the size of the particles. The passive separation structure 130 of the example system 100 includes an array of columns 132, or posts, that are arranged to facilitate separation of particles in the flow based on the size of the particles. For example, the columns 132 may be arranged in accordance with principles of deterministic lateral displacement (DLD), which is described below in greater detail with reference to FIG. 2.

In the illustration of FIG. 1, the flow of particles enters the separation chamber 220 from the left side. As the particles flow through the separation chamber 220, the array of columns 132 causes the particles to separate according to size. In this regard, the example system 100 includes at least two output channels 140. Each output channel is in fluid communication with the separation chamber 120 and positioned to receive separated particles. Thus, each output channel 140 is positioned to receive particles of a certain size or range of sizes.

The example system 100 of FIG. 1 is provided with an integrated pump 150 to facilitate flow of particles through the separation chamber 120. While the example system 100 of FIG. 1 is provided with the integrated pump 150 in the input channel 110, in various examples, the integrated pump 150 may be positioned within the input channel, an output channel 140 or a combination thereof. Thus, the integrated pump 150 may be a push pump provided in the input channel 110, as shown in FIG. 1, or a pull pump provided in an output channel 140.

In the example in which the example system 100 is a microfluidic device, each integrated pump 150 may be an inertial pump. As used herein, an inertial pump corresponds to a fluid actuator and related components disposed in an asymmetric position in a microfluidic channel, where an asymmetric position of the fluid actuator corresponds to the fluid actuator being positioned less distance from a first end of a microfluidic channel as compared to a distance to a second end of the microfluidic channel. Accordingly, in some examples, a fluid actuator of an inertial pump is not positioned at a mid-point of a microfluidic channel. The asymmetric positioning of the fluid actuator in the microfluidic channel facilitates an asymmetric response in fluid proximate the fluid actuator that results in fluid displacement when the fluid actuator is actuated. Repeated actuation of the fluid actuator causes a pulse-like flow of fluid through the microfluidic channel.

In some examples, an inertial pump includes a thermal actuator having a heating element (e.g., a thermal resistor) that may be heated to cause a bubble to form in a fluid proximate the heating element. In such examples, a surface of a heating element (having a surface area) may be proximate to a surface of a microfluidic channel in which the heating element is disposed such that fluid in the microfluidic channel may thermally interact with the heating element. In some examples, the heating element may comprise a thermal resistor with at least one passivation layer disposed on a heating surface such that fluid to be heated may contact a topmost surface of the at least one passivation layer. Formation and subsequent collapse of such bubble may generate unidirectional flow of the fluid. As will be appreciated, asymmetries of the expansion-collapse cycle for a bubble may generate such flow for fluid pumping, where such pumping may be referred to as "inertial pumping." In other examples, a fluid actuator corresponding to an inertial pump may comprise a membrane (such as a piezoelectric membrane) that may generate compressive and tensile fluid displacements to thereby cause fluid flow.

Figure 2:
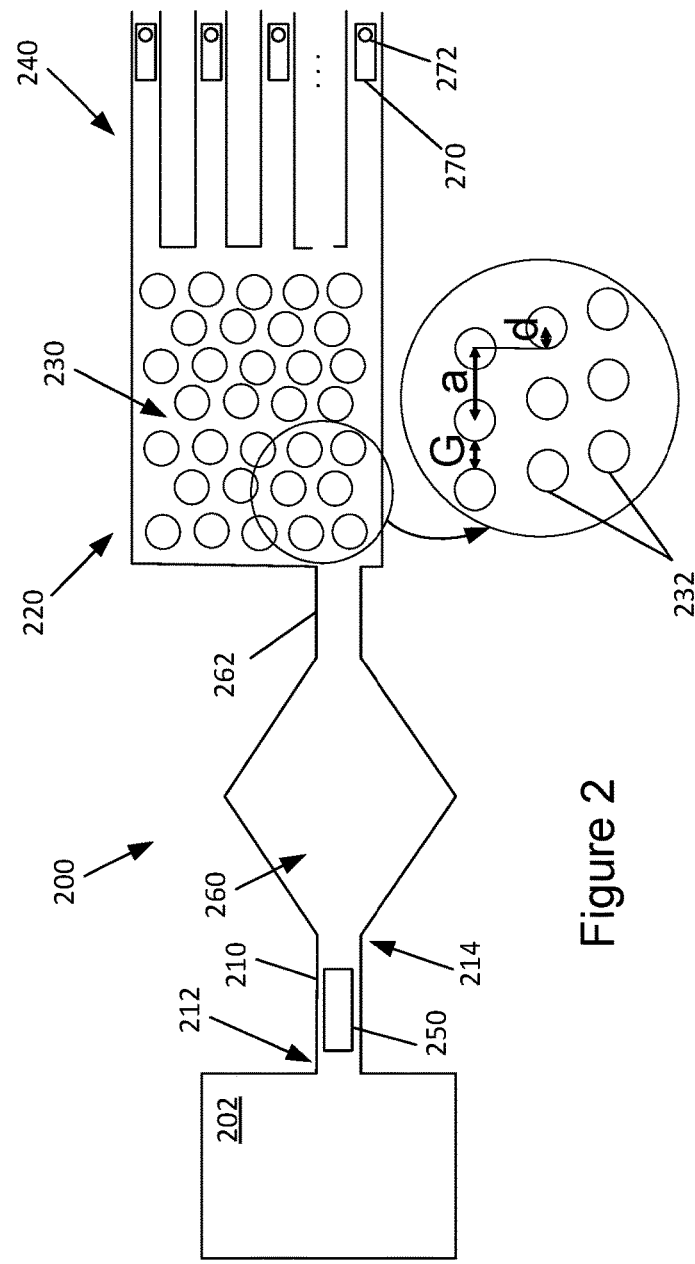
FIG. 2 illustrates another example system for separation of particles.

Referring now to FIG. 2, another example system for separation of particles is illustrated. The example system 200 of FIG. 2 is similar to the example system 100 of FIG. 1 and includes an input channel 210, a separation chamber 220 and a set of output channels 240. Similar to the example system 100 of FIG. 1, the input channel 210 has a first end 212 and a second end 214. The separation chamber 220 is in fluid communication with the second end 214 of the input channel 210. The separation chamber 220 includes a passive separation structure 230 which includes an array of columns 232 arranged to facilitate separation of particles in the flow based on the size of the particles.

The example system 200 of FIG. 2 is provided with an integrated pump 250 in the input channel 210. In order to reduce pulsing in the separation chamber 220 due to operation of the integrated pump 250, the example system 200 is provided with a dampening chamber 260 positioned between the second end 214 of the input channel 210 and the separation chamber 220. The dampening chamber 260 is in fluid communication with the separation chamber 220 through a focusing channel 262. The dampening chamber 260 allows for a more steady flow of particles into the separation chamber 220. In the example system 200 of FIG. 2, a sample reservoir 202 is provided for supplying a flow of particles to the input channel 210. In various examples, the integrated pump 250 may draw particles from the sample reservoir 202 for flow through the input channel 210, the dampening chamber 260 and the separation chamber 220. In various examples, the sample reservoir 202 may be replaceable or refillable.

In addition to the integrated pump 250 in the input channel, each output channel 240 of the example system 200 is provided with an integrated pump 270. The integrated pumps 270 in the output channels 240 are coupled to nozzles 272 to allow ejection of the separated particles, for example. The nozzles 272 may allow the separated particles to be selectively drawn or dropped as desired.

As noted above, the passive separation structure 230 includes an array of columns 232 that may be arranged in accordance with DLD principles. DLD uses a specific arrangement of obstacles, such as columns 232, to control the path, or trajectory, of particles to separate particles larger than a critical diameter from those smaller than the critical diameter through collisions with the obstacles. In a flow, when a particle is larger than the critical diameter, its center is positioned such that collision with an obstacle causes the larger particle to flow to one side of the obstacle. Meanwhile, collision of objects smaller than the critical diameter the same obstacle causes the smaller particle to flow to the other side of the obstacle.

In various examples, the columns 232 may be formed with any of a variety of shapes, or cross-sectional shape. For example, the columns 232 may be formed as circular, triangular or any polygonal shape, for example. Further, the array of columns 232 may be formed with the columns 232 have a particular size (e.g., cross-sectional diameter), a column spacing (G) and a column pitch (d/a). The array of columns may be formed to separate particles based on a critical diameter, which may be calculated as $2*\alpha*G*$pitch, where a is a non-dimensional correction factor determined as sqrt(a/3d). In one example, the array of columns 232 is formed to separate particles of 0.75 µm. In this example, the columns 232 may be formed as circular cylinders having a cross-sectional diameter of 5 µm, a pillar spacing (G) of 5 µm and a pitch (d/a) of 0.01. In this arrangement, particles larger than 0.75 µm are separated from particles smaller than 0.75 µm.

In various examples, the separation chamber 220 may be divided into zones to further separate particles. For example, in a first zone, the particles may be divided based on a critical diameter of 0.75 µm, as described above. In a downstream zone, the particles larger than 0.75 µm may be further separated with a critical diameter of 1.00 µm. Thus, three paths may be formed with a first path for particles smaller than 0.75 µm, a second path for particles larger than 0.75 µm but smaller than 1.00 µm, and a third path for particles larger than 1.00 µm. Of course, the particles may be separated into as many size categories as desired or as may be accommodated by the size of the separation chamber.

In this regard, FIG. 3 illustrates separation of particles in the example system 200 of FIG. 2. FIG. 3 illustrates separation of flow into four paths. As noted above, any practical number of paths may be formed in the separation chamber 220. In the example of FIG. 3, the passive separation structure 230 results in particles in four size categories being directed along a corresponding path 292, 294, 296, 298. Each of the paths 292, 294, 296, 298 corresponds to one of the output channels 240.

In various examples described and illustrated herein, an inlet of the flow of particles into the separation chamber 220 is positioned to provide a flow to a particular region of the separation chamber 220. For example, FIGS. 2 and 3 illustrate the focusing channel 262 being in fluid communication with a lower left portion of the separation chamber 220. It will be understood that, in various examples, an input to the separation chamber, such as the focusing channel 262 or the input channel 110 of FIG. 1, may be positioned to interface with other regions of the separation chamber 220. For example, the focusing channel 262 may be coupled to a central or upper left portion of the separation chamber 220. In this regard, the passive separation structure 230 may form paths 292, 294, 298, 298 from the specific input region to the various output channels 240.

Referring now to FIG. 4, another example system 400 for separation of particles is illustrated. The example system 400 of FIG. 4 is similar to the example system 200 of FIG. 2. In this regard, the example system 400 includes an input channel 410 with a first end 412 and a second end 414, a separation chamber 420 with a passive separation structure 430 formed with an array of columns 432, and a set of output channels 440. The example system 400 further includes a dampening chamber 460 in fluid communication with the separation chamber 420 through a focusing channel 462. The example system 400 of FIG. 4 is provided with integrated pumps 450a, 450b in the input channel 410, as well as integrated pumps 470a-n in the output channels 440a-n. As noted above, each integrated pump 470a-n in the output channels 440a-n is coupled to a nozzle 472a-n.

The example system 400 of FIG. 4 is further provided with a reagent input channel 480. The reagent input channel 480 is in fluid communication with a first output channel 440a. The reagent input channel 480 may be used to mix a reagent, such as a lysing agent, with the flow of separated particles (e.g., concentrated or purified) in the corresponding output channel 440a. In this regard, a mixing pump 482 may be provided to facilitate or control the mixing of the separate particles with a reagent in the first output channel 440a. The mixing pump 482 may be similar to the pumps 450a,b and 470a-n and may be an integrated pump (e.g., an inertial pump).

In the example system 400 of FIG. 4, the dampening chamber 460 is provided with dampening features 464 to facilitate reduction of pulsing in the separation chamber 420. In various example, the features may include an array of orifices, an elastic membrane or other such features. In one example, the dampening features 464 are orifices that are round, rectangular or other geometric shape.

Figure 5:
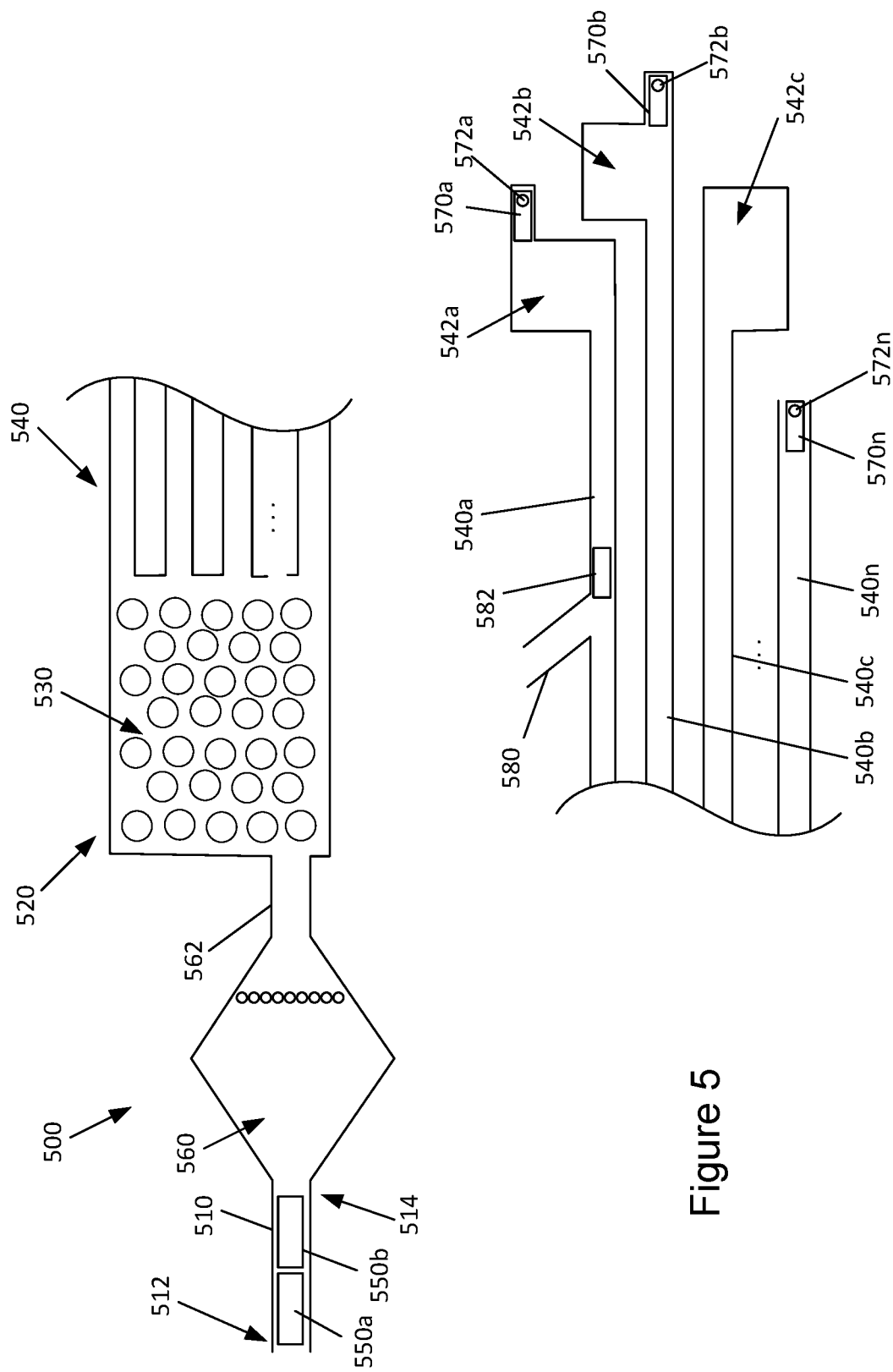
FIG. 5 illustrates another example system for separation of particles.

Referring now to FIG. 5, another example system 500 for separation of particles is illustrated. The example system 500 of FIG. 5 is similar to the example system 400 of FIG. 4. In this regard, the example system 500 includes an input channel 510 with a first end 512 and a second end 514, a separation chamber 520 with a passive separation structure 530 formed with an array of columns 532, and a set of output channels 540. The example system 500 further includes a dampening chamber 560 in fluid communication with the separation chamber 520 through a focusing channel 562. The example system 500 of FIG. 5 is provided with integrated pumps 550a, 550b in the input channel 510, as well as integrated pumps 570a-n in the output channels 540a-n. As noted above, each integrated pump 570a-n in the output channels 540a-n is coupled to a nozzle 572a-n. The example system 500 of FIG. 5 further includes a reagent input channel 580 in fluid communication with a first output channel 540a and a mixing pump 582 to facilitate or control the mixing in the first output channel 540a.

In the example system 500 of FIG. 5, holding reservoirs 542a-c are provided for long-term or short-term storage of separated particles. In this regard, the holding reservoirs 542a-c are coupled to corresponding output channels 540a-c, respectively. For example, the first output channel 540a leads to the first holding reservoir 542a for storage of a first separated particle or a first category of particles. In the example system 500 illustrated in FIG. 5, the first holding reservoir 542a may hold the first separated particle or first category of particles mixed with a reagent which may be introduced through the reagent input channel 580. The pump 570a and corresponding nozzle 572a may be used to retrieve or eject the stored particles in the first reservoir 542a. Similarly, the second output channel 540b leads to the second holding reservoir 542b for storage of a second separated particle or a second category of particles, which may be accessed through the pump 570b and corresponding nozzle 572b.

The third output channel 540c leads to the third holding reservoir 542c for storage of a third separated particle or a third category of particles. In the example system 500 illustrated in FIG. 5, the third holding reservoir 542c may be provided to store the third separated particle or third category of particles. Accordingly, the third holding reservoir 542c is not provided with a pump or nozzle. In various examples, the third holding reservoir 542c is fluidically coupled to the ambient environment to allow flow through the third output channel 540c and into the third holding reservoir 542.

Figure 6:
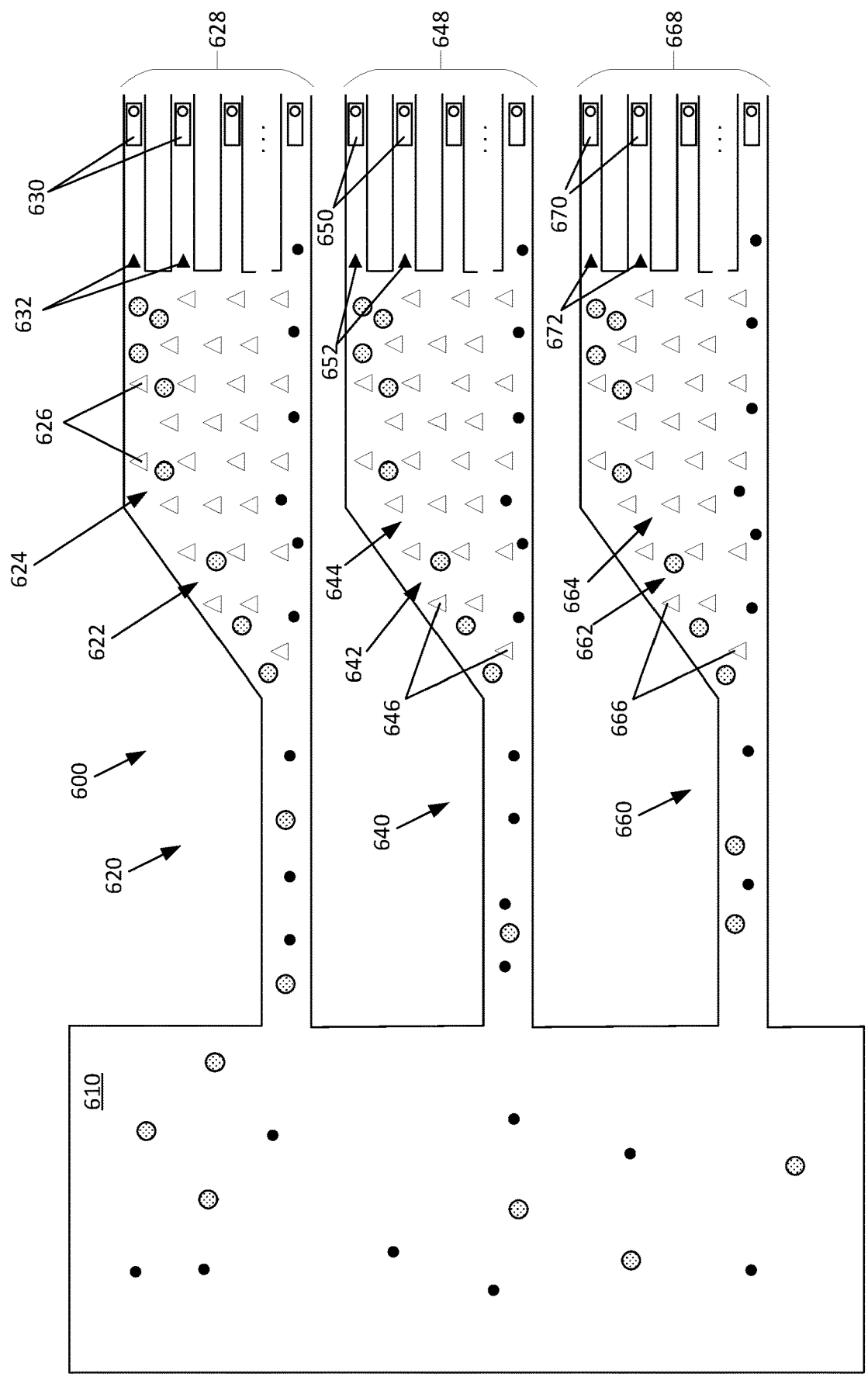
FIG. 6 illustrates another example system for separation of particles.

Referring now to FIG. 6, another example system 600 for separation of particles is illustrated. The example system 600 provides for a scaling of the particle separation as described in the various examples above. In this regard, a sample reservoir 610 containing a combination of particles is coupled to an array of separation arrangements 620, 640, 660, each of which is provided to separate the particles based on the size of the particles. In this regard, the separation arrangements 620, 640, 660 operate in parallel to separate a large number of particles, for example. In the example of FIG. 6, three separation arrangements 620, 640, 660 are illustrated. In various examples, the number of separation arrangements 620, 640, 660 may be any practical number. For example, in various cases, the number of separation arrangement be in the order of magnitude of tens, hundreds or thousands.

In the example system 600 of FIG. 6, each separation arrangement in the array includes a separation chamber 622, 642, 662 in fluid communication with the sample reservoir 610. Each separation chamber 622, 642, 662 includes a passive separation structure 624, 644, 664. As described above, the passive separation structure 624, 644, 664 includes an array of columns 626, 646, 666 spaced apart to facilitate separation of particles in a flow based on a size of the particles, such as via DLD. Each separation chamber 622, 642, 662 is in fluid communication with a set of output channels 628, 648, 668. Integrated pumps 630, 650, 670 are provided in the output channels 628, 648, 668 to facilitate flow of the separated particles through the separation chambers 622, 642, 662 and through the output channels 628, 648, 668.

In the example system 600 of FIG. 6, some of the output channels 628, 648, 668 may be provided with a filter 632 positioned close to the entrance to the output channels 628, 648, 668. Thus, a filter 632 may be positioned proximate to the interface of a corresponding output channels 628, 648, 668 and the separation chamber 622, 642, 662. In various examples, the filters 632 may be provided to prevent a target particle from exiting the system 600. In this regard, the target particle may be accumulated within the separation chamber 622, 642, 662. For example, the sample reservoir 610 may be provided with a particle, such as a bead, that attaches itself to a biological material, such as a DNA fragment. The DNA fragment may then be separated from other particles based on the size of the bead. In the example of FIG. 6, the size of the bead may direct it to the upper most path in each separation chamber 622, 642, 662. The filter 632 may allow the biological material to pass through, but may retain the bead within the separation chamber 622, 642, 662.

Figure 7:
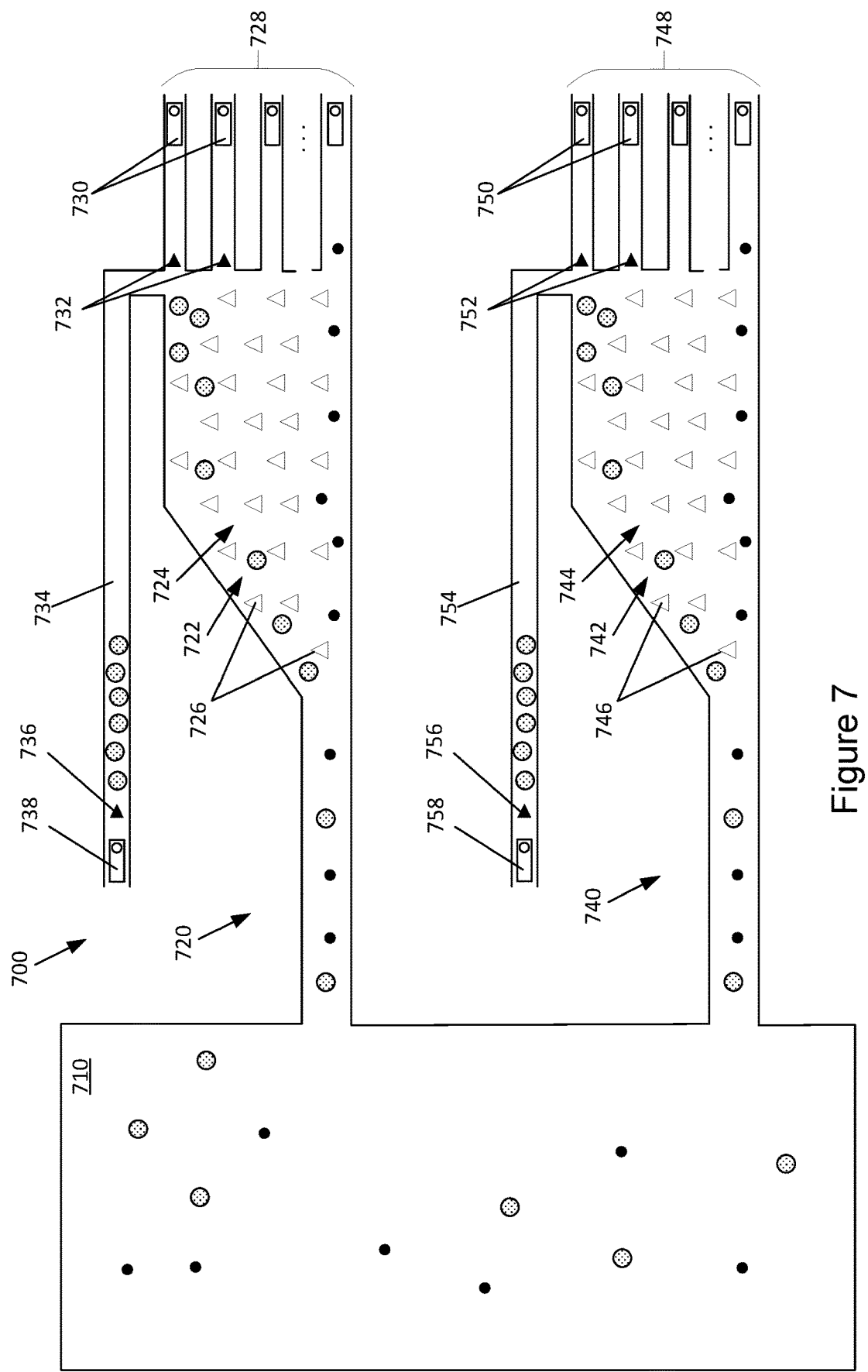
FIG. 7 illustrates another example system for separation of particles.

Referring now to FIG. 7, another example system 700 for separation of particles is illustrated. The example system 700 of FIG. 7 is similar to the example system 600 of FIG. 6. In this regard, the example system 600 includes a sample reservoir 710 coupled to an array of separation arrangements 720, 740. While FIG. 7 illustrates two separation arrangements 720, 740, other examples may include any practical number that may be in an order of magnitude of 10's, 100's or 1000's, for example. Each separation arrangement 720, 740 in the array includes a separation chamber 722, 742 in fluid communication with the sample reservoir 710. Each separation chamber 722, 742 includes a passive separation structure 724, 744 which includes an array of columns 726, 746 spaced apart to facilitate separation of particles in a flow based on a size of the particles. Each separation chamber 722, 742 is in fluid communication with a set of output channels 728, 748, and integrated pumps 730, 750 are provided in the output channels 728, 748. Various output channels 728, 748 are provided with a filter 732 positioned proximate to the interface of a corresponding output channels 728, 748 and the separation chamber 722, 742.

The example system 700 of FIG. 7 is provided with a secondary output channel 734, 754. As described above with reference to FIG. 6, the filters 732 may cause a target particle to accumulate in a region of the separation chambers 722, 742. The secondary output channel 734, 754 is provided as an outlet for the accumulated particles to be directed out of the separation chambers 722, 742, for example, for collection in a specified region. In the example system 700 of FIG. 7, each secondary output channel 734, 754 is provided with a filter 736, 756 and an output nozzle 738, 758. The filters 736, 756 may be provided to retain the target particles in the secondary output channel 734, 754, while the nozzles 738, 758 may be used to expel other components, such as other particles or a carrying fluid, for example. In other examples, the filters 736, 756 may not be provided to allow the target particle to be removed or directed to another region.

Figure 8:
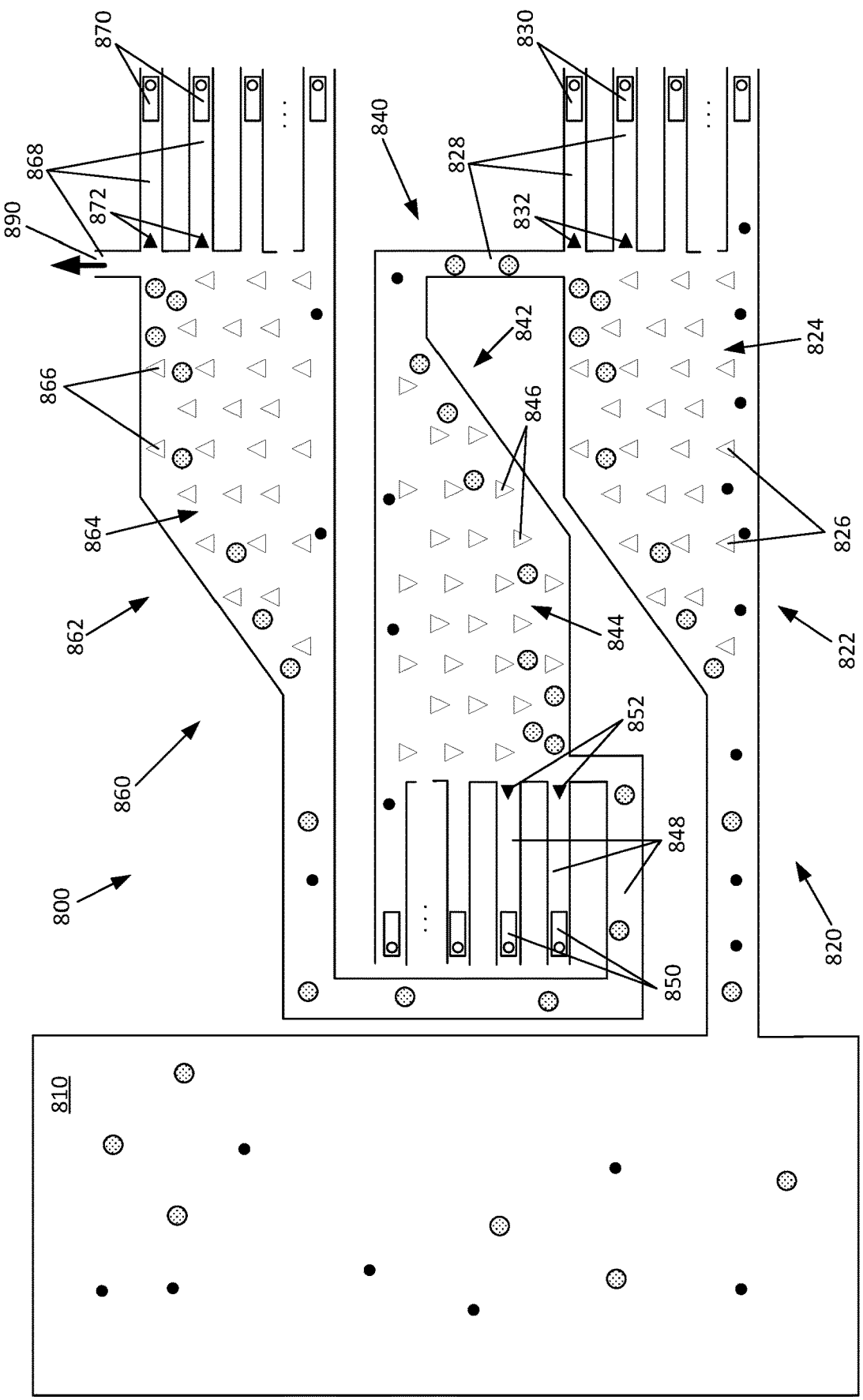
FIG. 8 illustrates another example system for separation of particles.

Referring now to FIG. 8, another example system for separation of particles is illustrated. The example system 800 provides for cascading of the purification or separation of particles as described in the various examples above. The example system 800 includes a sample reservoir 810 containing a combination of particles and multiple separation arrangement 820, 840, 860. In this regard, the separation arrangements 820, 840, 860 operate in series with each separation arrangement further purifying an output of the previous separation arrangement.

Thus, the example system 800 of FIG. 8 provides a first separation arrangement 820 with a first separation chamber 822 in fluid communication with the sample reservoir 810. The first separation chamber 822 includes a passive separation structure 824 which includes an array of columns 826 spaced apart to facilitate separation of particles in a flow into at least two paths based on a size of the particles, such as via DLD. The first separation chamber 822 is in fluid communication with a set of output channels 828 with integrated pumps 830 provided therein, each output channel 828 corresponding to one of the at least two paths. At least some of the output channels 828 of the first separation arrangement 820 are provided with a filter positioned proximate to the interface of the output channel 828 and the separation chamber 822 to cause accumulation of a target particle in a region of the separation chamber.

The example system 800 of FIG. 8 further includes a second separation arrangement 840 that is similar to the first separation arrangement 820. The second separation arrangement 840 includes a second separation chamber 842 in fluid communication with at least one output channel of the first separation arrangement 820. Similar to the first separation arrangement 820, the second separation arrangement 840 is provided with a second passive separation structure 844 within the second separation chamber 842 to facilitate separation of particles into at least two sub-paths.

The coupling of the second separation chamber 842 to an output channel 828 of the first separation arrangement 820 causes the accumulated target particle to be directed into the second separation chamber 842. Thus, the second passive separation structure 844 further separates or purifies the accumulated target particle. In various examples, the second passive separation structure 844 may be identical to the first separation structure and serves to further remove debris or other impurities from the accumulated target particle. In other examples, the second passive separation structure 844 may be different from the first separation structure and may serve to sub-divide the accumulated target particle. For example, the accumulation in the first separation chamber 822 may include particles above a certain size, such as 0.50 μm. In this case, the second passive separation structure 844 may separate the particles into various size ranges using various critical separation sizes such as, for example, 0.60 μm, 0.70 μm, and 0.80 μm.

The second separation chamber 842 is in fluid communication with a set of output channels 848 with integrated pumps 850 provided therein. Each output channel 848 corresponds to one of the at least two sub-paths of the second separation chamber 842. At least some of the output channels 848 of the second separation arrangement 840 are provided with a filter positioned proximate to the interface of the output channel 848 and the separation chamber 842 to cause accumulation of a target particle. In some examples, the target particle in the second separation chamber 842 is the same as the target particle in the first separation chamber 822, while in other examples, the target particle may be a different particle.

In the example system 800 illustrated in FIG. 8, the cascading of the separation of particles continues through a third separation arrangement 860. The third separation arrangement 860 includes a third separation chamber 862 coupled to an output channel 848 of the second separation arrangement 840. The third separation arrangement 860 includes a third passive separation structure 864 within the third separation chamber 862.

The third separation chamber 862 is in fluid communication with a set of output channels 868 with integrated pumps 870 provided therein. At least one output channel 890 of the third separation arrangement 860 outputs the target particle from the system 800, for example, for post-processing or for use in a reaction.

Thus, FIG. 6 illustrates a scaling of the separation of particles with separation arrangements 620, 640, 660 operating in parallel, and FIG. 8 illustrates a cascading of the separation with separation arrangements 820, 840, 860 operating in series. Of course, in various examples, the two example system 600, 800 may be combined. For example, the example system 800 of FIG. 8 may be scaled by coupling multiple cascading separation arrangements in parallel to the sample reservoir 810.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A system, comprising:
   an input channel having a first end and a second end to receive particles through the first end;
   a separation chamber in fluid communication with the second end of the input channel, the separation chamber having a passive separation structure, the passive separation structure including an array of columns spaced apart to facilitate separation of particles in a flow into at least two paths based on a size of the particles;
   at least two output channels, each output channel in fluid communication with the separation chamber to receive separated particles, each output channel corresponding to one of the at least two paths; and
   an integrated pump configured to facilitate flow through the separation chamber, the integrated pump being disposed entirely within an inside of at least one of the input channel or one of the at least two output channels.

2. The system of claim 1, wherein the array of columns is arranged to deterministically direct a particle in a flow colliding with the columns to a first side if the particle in the flow is smaller than a critical diameter and to a second side if the particle in the flow is larger than the critical diameter.

3. The system of claim 1, wherein the input channel and each output channel are microfluidic channels.

4. The system of claim 3, wherein the integrated pump is an inertial pump.

5. The system of claim 4, wherein the integrated pump includes a thermal inkjet resistor.

6. The system of claim 1, further comprising:
   a dampening chamber positioned between the second end of the input channel and the separation chamber, the dampening chamber being in fluid communication with the separation chamber through a focusing channel.

7. The system of claim 6, wherein the dampening chamber includes a dampening feature, the dampening feature including at least one of an orifice or a membrane.

8. The system of claim 1, wherein at least one output channel of the at least two output channels includes an integrated pump disposed entirely within an inside of at least one of the output channels.

9. The system of claim 1, further comprising:
   a reagent input channel in fluid communication with a first output channel of the at least two output channels, wherein flow from the reagent input channel is to mix with flow of separated particles from the separation chamber in the first output channel.

10. The system of claim 1, further comprising:
    a holding reservoir in fluid communication with at least one of the at least two output channels.

11. The system of claim 1, further comprising:
    a filter positioned proximate to an interface of the separation chamber and an output channel, the filter being to prevent a predetermined particle from exiting the separation chamber.

12. The system of claim 11, further comprising:
    a secondary output channel in fluid communication with the separation chamber proximate to the filter, the secondary output channel to direct accumulation of the predetermined particle out of the separation chamber.

13. A system, comprising:
    a sample reservoir;
    an array of separation arrangements, each separation arrangement in the array including: a separation chamber in fluid communication with the sample reservoir, the separation chamber having a passive separation structure, the passive separation structure including an array of columns spaced apart to facilitate separation of particles in a flow into at least two paths based on a size of the particles;
    at least two output channels, each output channel in fluid communication with the separation chamber to receive separated particles, each output channel corresponding to one of the at least two paths; and an integrated pump configured to facilitate flow through the separation chamber, the integrated pump being disposed entirely within an inside of at least one of the at least two output channels.

14. The system of claim 13, wherein the integrated pump is an inertial pump.

15. A system, comprising:

a sample reservoir;

a first separation chamber in fluid communication with the sample reservoir, the first separation chamber having a first passive separation structure, the first passive separation structure including an array of columns spaced apart to facilitate separation of particles in a flow into at least two paths based on a size of the particles;

at least two output channels, each output channel in fluid communication with the first separation chamber and corresponding to one of the at least two paths;

a second separation chamber in fluid communication with at least one of the at least two output channels, the second separation chamber having a second passive separation structure to facilitate separation of particles into at least two sub-paths based on a size of the particles; least two sub-output channels, each sub-output channel in fluid communication with the second separation chamber and corresponding to one of the at least two sub-paths; and an integrated pump configured to facilitate flow from the sample reservoir through the first separation chamber and the second separation chamber, the integrated pump being disposed entirely within an inside of within at least one of the at least two output channels or at least one of the at least two sub-output channels.

* * * * *